(12) United States Patent
Jenkins

(10) Patent No.: US 9,430,165 B1
(45) Date of Patent: Aug. 30, 2016

(54) COLD STORAGE FOR DATA STORAGE DEVICES

(71) Applicant: Western Digital Technologies, Inc., Irvine, CA (US)

(72) Inventor: Dean M. Jenkins, La Canada-Flintridge, CA (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 240 days.

(21) Appl. No.: 14/023,399

(22) Filed: Sep. 10, 2013

Related U.S. Application Data

(60) Provisional application No. 61/858,015, filed on Jul. 24, 2013.

(51) Int. Cl.
*G06F 3/06* (2006.01)

(52) U.S. Cl.
CPC ............ *G06F 3/0659* (2013.01); *G06F 3/061* (2013.01); *G06F 3/0683* (2013.01)

(58) Field of Classification Search
None
See application file for complete search history.

(56) References Cited

U.S. PATENT DOCUMENTS

| 7,146,521 | B1* | 12/2006 | Nguyen | G06F 1/206 702/130 |
| 7,516,272 | B2 | 4/2009 | Felton et al. | |
| 7,603,515 | B1 | 10/2009 | Felton et al. | |
| 7,917,665 | B1 | 3/2011 | Booth et al. | |
| 8,078,906 | B2 | 12/2011 | Yochai et al. | |
| 8,095,760 | B2 | 1/2012 | Mizuno et al. | |
| 8,255,737 | B1* | 8/2012 | Aster et al. | 714/5.1 |
| 2003/0182504 | A1 | 9/2003 | Nielsen et al. | |
| 2004/0139260 | A1* | 7/2004 | Steinmetz | G06F 3/0607 710/269 |
| 2004/0148460 | A1* | 7/2004 | Steinmetz | G06F 3/0611 711/114 |
| 2004/0148461 | A1* | 7/2004 | Steinmetz | G06F 3/0607 711/114 |
| 2004/0260875 | A1 | 12/2004 | Murotani et al. | |
| 2005/0165955 | A1* | 7/2005 | Wakelin et al. | 709/238 |
| 2005/0204078 | A1* | 9/2005 | Steinmetz | G06F 3/0611 710/38 |
| 2007/0088978 | A1* | 4/2007 | Lucas et al. | 714/9 |
| 2007/0192639 | A1* | 8/2007 | Nichols et al. | 713/300 |
| 2008/0016275 | A1* | 1/2008 | Sebastian | G06F 3/0613 711/114 |
| 2008/0080131 | A1 | 4/2008 | Hori et al. | |
| 2008/0126616 | A1* | 5/2008 | Kumasawa et al. | 710/42 |
| 2008/0162811 | A1* | 7/2008 | Steinmetz | G06F 13/4234 711/114 |

(Continued)

OTHER PUBLICATIONS

WayBack Machine Internet Archive page capture of Wikipedia page on Arbitrated Loop, https://web.archive.org/web/20120628204322/http://en.wikipedia.org/wiki/Arbitrated_loop, captured Jun. 28, 2012, last modified Mar. 5, 2012.*

(Continued)

*Primary Examiner* — Kevin Verbrugge

(57) ABSTRACT

A data storage system and method for cold storage. The data storage system includes a plurality of data storage devices (DSD). Each DSD includes a processor, two ports, and a storage medium. The second port of each DSD is connected to the first port of a neighboring DSD, forming a sequential connection. A data command is sent to the first DSD in the sequential connection and the first DSD's processor determines whether the first DSD is a destination for the data command. If the first DSD is the destination, the storage medium of the first DSD is powered up. If the first DSD is not the destination, the data command is sent to a next DSD via the second port of the first DSD. The data command is sent through the sequential connection until it reaches the destination DSD, which services the data command.

18 Claims, 5 Drawing Sheets

(56) References Cited

U.S. PATENT DOCUMENTS

| | | |
|---|---|---|
| 2010/0049919 A1 | 2/2010 | Winokur et al. |
| 2011/0191637 A1* | 8/2011 | Wight et al. ................... 714/43 |
| 2011/0191644 A1* | 8/2011 | Oldfield et al. ............. 714/704 |
| 2013/0080829 A1* | 3/2013 | Colline ........................ 714/6.22 |
| 2014/0203696 A1* | 7/2014 | Rust et al. ................. 312/330.1 |
| 2014/0204522 A1* | 7/2014 | Keffeler ................... 361/679.31 |
| 2014/0204525 A1* | 7/2014 | Pecone et al. ........... 361/679.33 |
| 2014/0204537 A1* | 7/2014 | Rust .............................. 361/727 |

OTHER PUBLICATIONS

HGST, a Western Digital Company, "Dual-Port Sas Drives are a Boon to IT" http://www.hgst.com/tech/techlib.nsf/techdocs/355A0793113E48AF8625740B007F7ABA/$file/Dual-port_SAS_white_paper_v3.pdf Nov. 2007, pp. 1-2.

\* cited by examiner

COLD STORAGE FOR DATA STORAGE DEVICES

CROSS-REFERENCE TO RELATED APPLICATION(S)

This application claims the benefit of U.S. Provisional Application No. 61/858,015, filed on Jul. 24, 2013, which is hereby incorporated by reference in its entirety.

BACKGROUND

Data centers can provide cloud storage systems to remotely store data for networked systems. However, such cloud storage systems can consume large amounts of power at the data center to store and manage data in an array of data storage devices (DSDs).

"Cold storage" generally refers to ways of providing more cost effective storage for rarely accessed data. Such cold storage can include powering only the DSD required for an active request for data. However, efficient management of which DSD to activate and power up typically requires additional specialized hardware which can add to the power and cost of the cold storage system.

BRIEF DESCRIPTIONS OF THE DRAWINGS

The features and advantages of the implementations of the present disclosure will become more apparent from the detailed description set forth below when taken in conjunction with the drawings. The drawings and the associated descriptions are provided to illustrate implementations of the disclosure and not to limit the scope of what is claimed.

Figure 1:
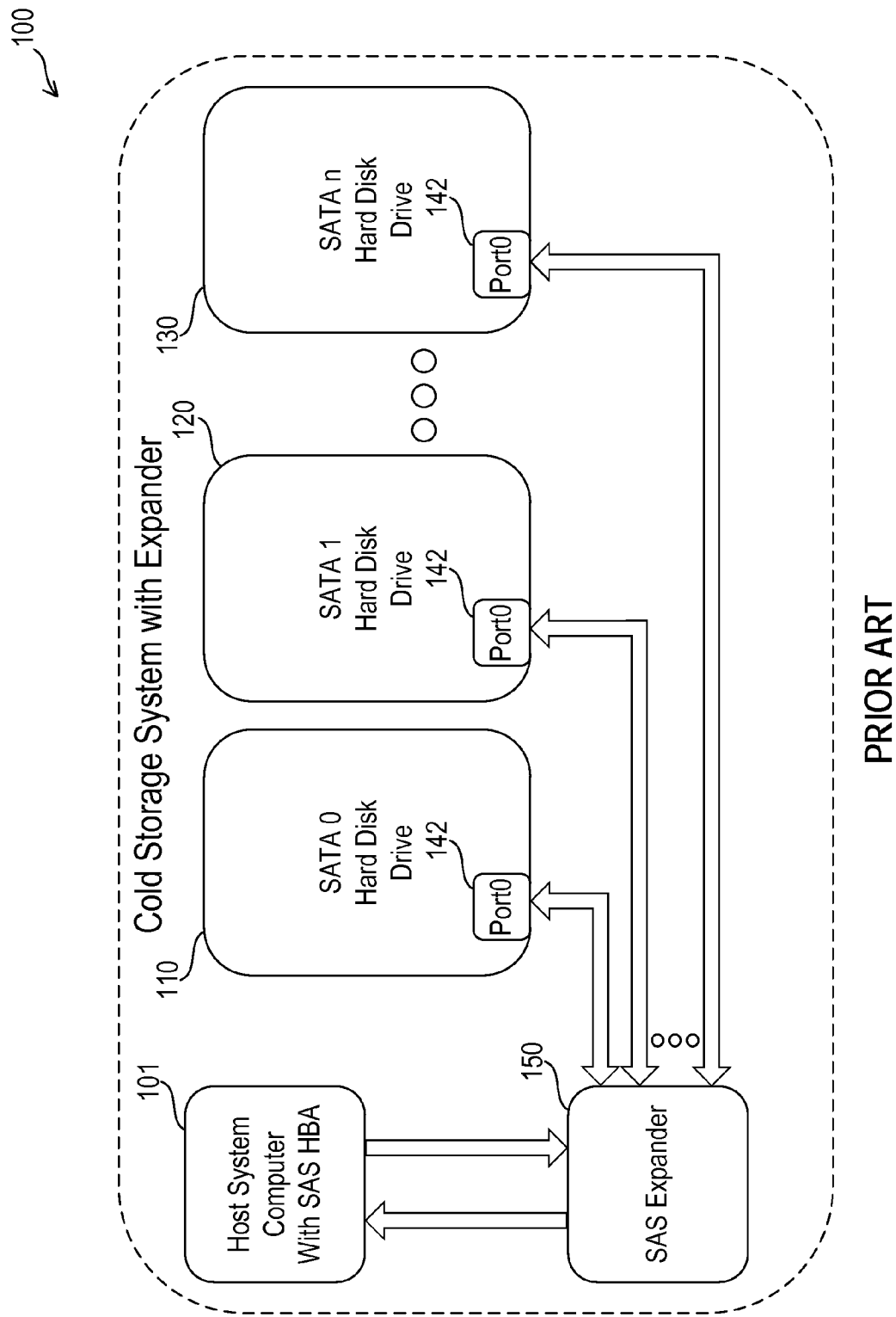
Figure 2A:
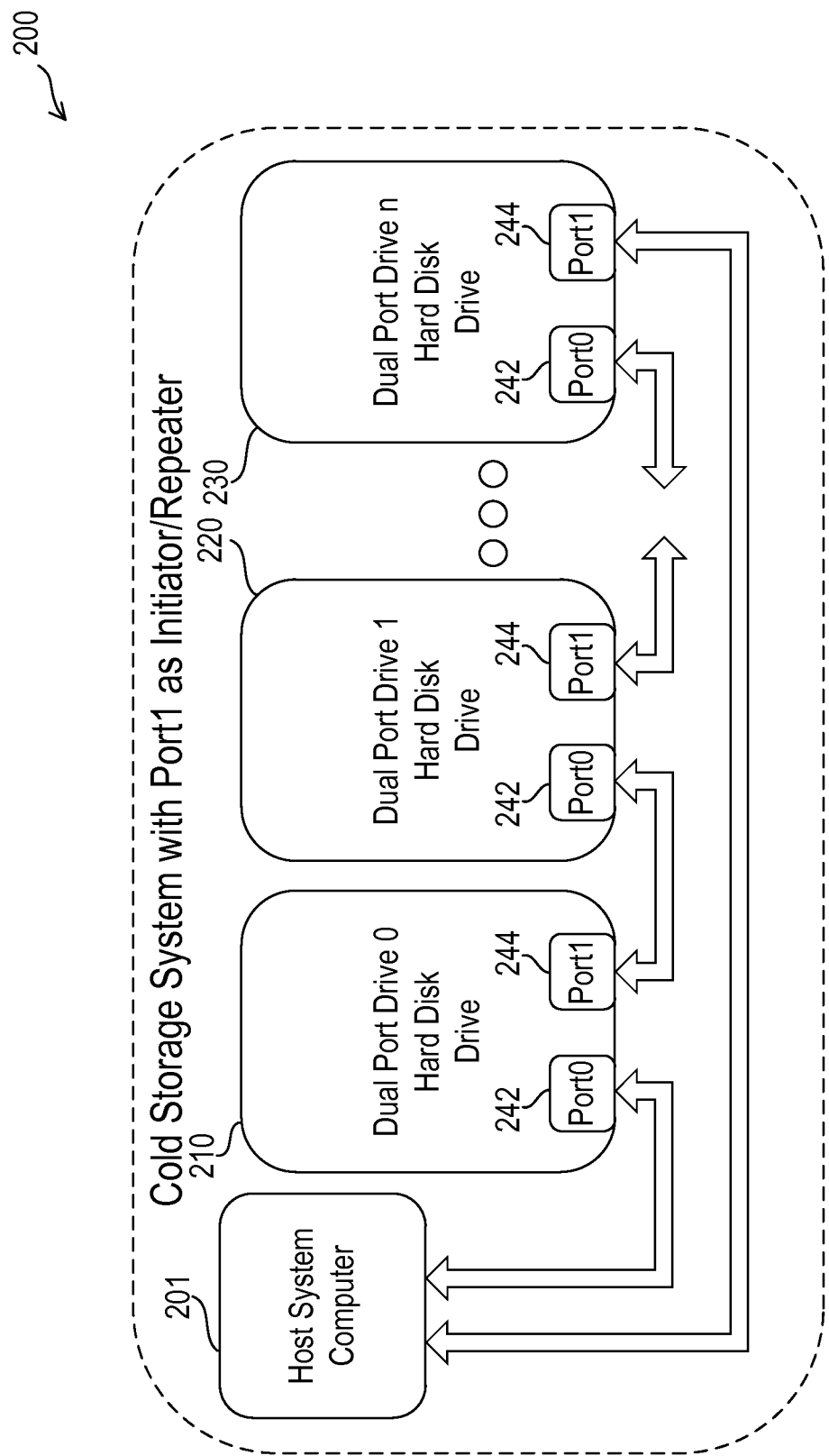
Figure 2B:
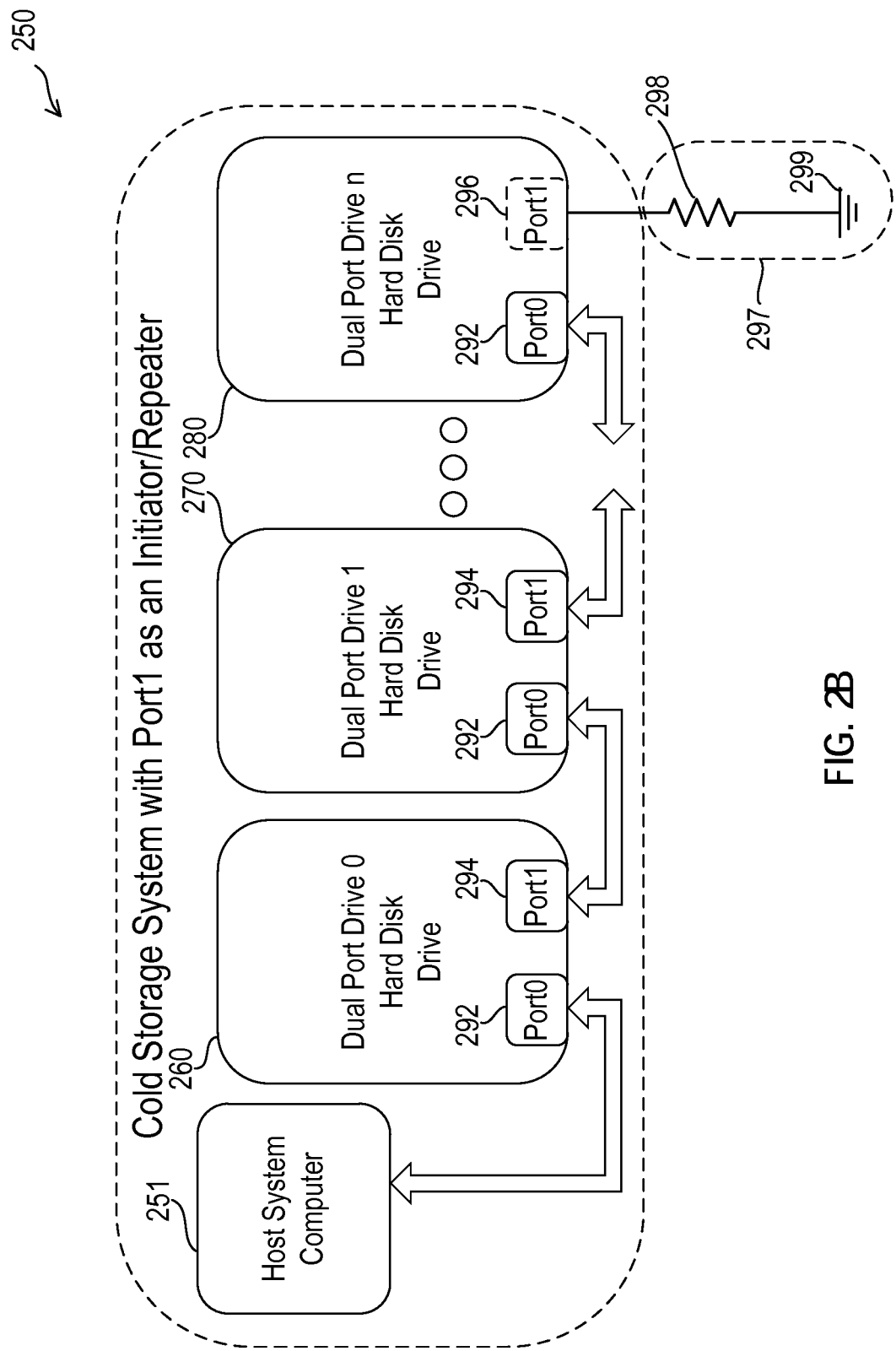
Figure 3:
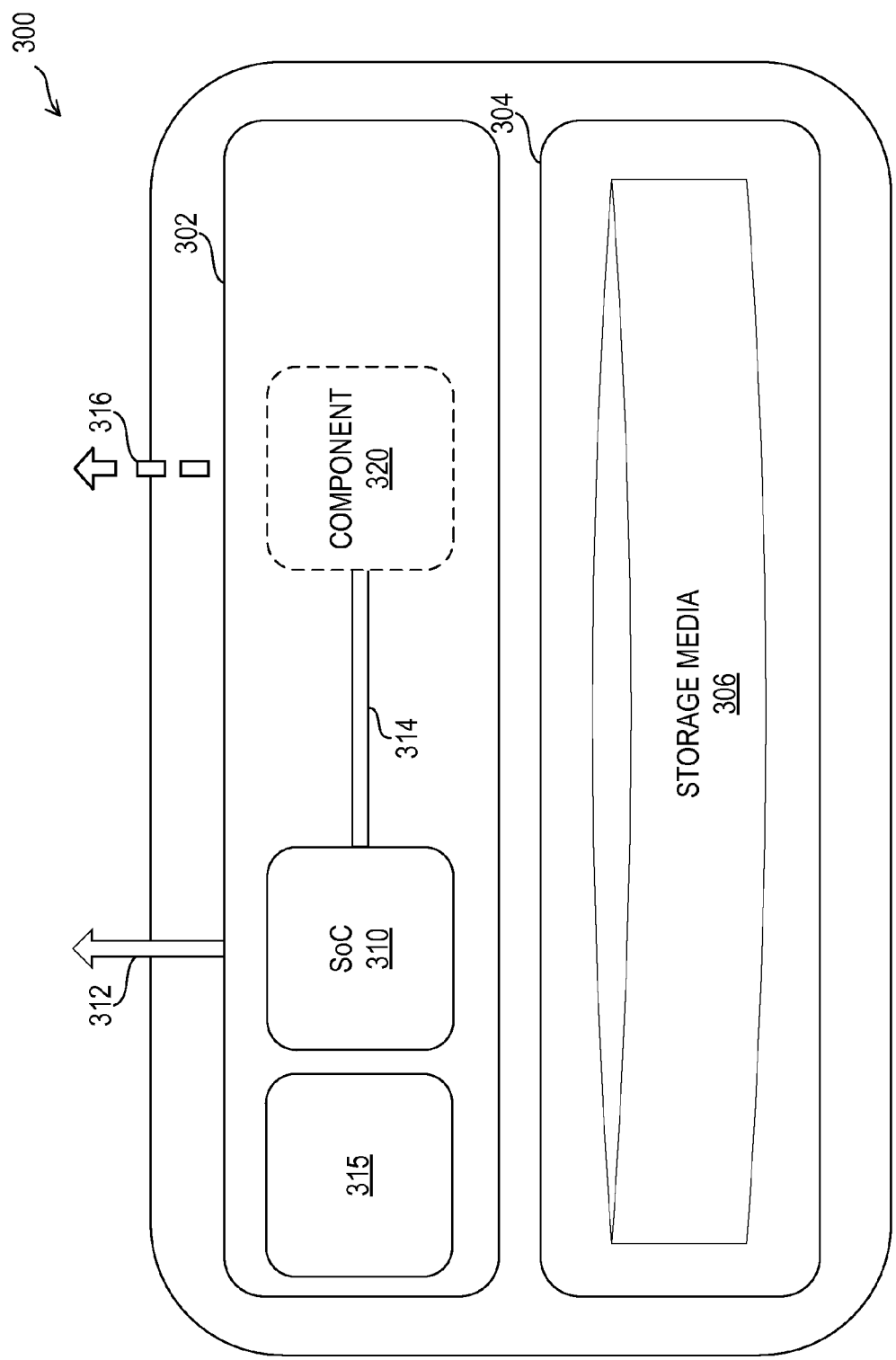
Figure 4:
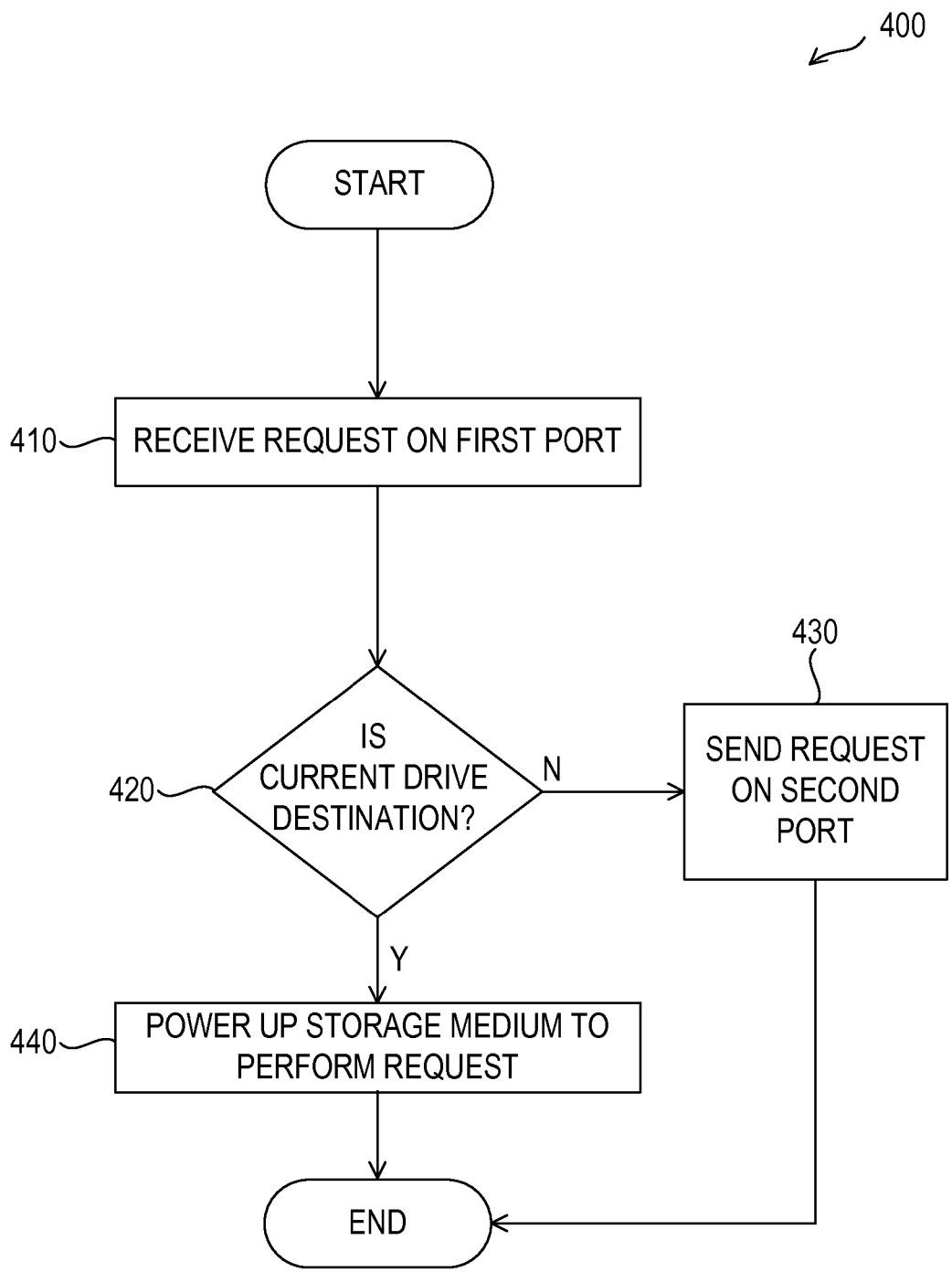

FIG. 1 presents a diagram of a conventional cold storage system using an Serially Attached SCSI (SAS) expander;

FIG. 2A presents a diagram of a cold storage system according to one implementation of the present disclosure;

FIG. 2B presents a diagram of a cold storage system according to another implementation of the present disclosure;

FIG. 3 presents a diagram of a data storage device (DSD) according to one implementation of the present disclosure; and FIG. 4 presents a flowchart of a firmware logic according to one implementation of the present disclosure.

DETAILED DESCRIPTION

In the following detailed description, numerous specific details are set forth to provide a full understanding of the present disclosure. It will be apparent, however, to one of ordinary skill in the art that the various implementations disclosed may be practiced without some of these specific details. In other instances, well-known structures and techniques have not been shown in detail to avoid unnecessarily obscuring the various implementations.

FIG. 1 presents a diagram of a conventional cold storage system configuration using an SAS expander. A cold storage system 100 comprises host 101 connected to a plurality of data storage devices (DSDs) such as a DSD 110, a DSD 120, and a DSD 130 through a Serially Attached SCSI (SAS) expander 150. The plurality of DSDs may be compatible with Serial Advance Technology Attachment (SATA), although in other implementations other protocols may be used.

The host 101 may be a networked computer system with an SAS host bus adapter (HBA) for communication with DSDs 110, 120, and 130 through the SAS protocol. Although the present disclosure refers to the SAS protocol, in other implementations other similar data transmission protocols may be used. The SAS expander 150 allows the host 101 to communicate with the plurality of DSDs because SAS is typically point-to-point. In other words, the SAS protocol generally allows for individual communication between host 101 and each of the plurality of DSDs. The SAS expander 150 manages multiple direct or point-to-point connections for the host 101. The DSDs 110, 120, and 130 may be hard disk drives (HDD), although in other implementations other types of DSDs, such as solid state drives (SSD), solid state hybrid drives (SSHD), and other types of DSDs may be used. The DSDs 110, 120, and 130 have a port 142 for communication with the SAS expander 150. The ports 142 may be SAS ports. Because the SAS expander 150 acts as a direct bridge to the host 101, the DSDs 110, 120, and 130 may only communicate with the SAS expander 150.

In operation, the host 101 sends a data command or request for data to the SAS expander 150. The SAS expander 150 determines which DSD or DSDs, such as DSDs 110, 120 and 130, to power up and send the data command to. In an implementation where the DSD includes a rotating magnetic disk for storing data, powering up the DSD can include increasing the angular velocity of the disk for accessing data (i.e., "spinning up" the disk). The SAS expander 150 sends the data command to the first port 142 of the appropriate DSD. Only the DSD receiving the data command is powered up, allowing the other DSDs to remain in a low power state to reduce costs of operation. In one example, the low power state can include keeping a disk of the DSD "spun down" to reduce power consumption by the DSD. However, the SAS expander 150 itself increases power usage and complexity of a conventional cold storage system. The SAS expander 150 may also have to remain powered to effectively manage the SAS connections.

FIG. 2A presents a cold storage system 200 according to an implementation of the present disclosure. The cold storage system 200 comprises host 201 in communication with a plurality of DSDs such as a DSD 210, a DSD 220, and a DSD 230. The plurality of DSDs may be compatible with SATA or SAS, although in other implementations other protocols may be used.

The host 201 may be a networked computer system with an SAS HBA for communication to DSDs 210, 220, and 230 through the SAS protocol. In other implementations other similar data transmission protocols may be used. The DSDs 210, 220, and 230 may be hard disk drives (HDD), although in other implementations other types of DSDs, such as solid state drives (SSD), solid state hybrid drives (SSHD), and other types of DSDs may be used. The DSDs 210, 220, and 230 have a first port 242 and a second port 244 for communication. The first and second ports 242 and 244 may be SAS ports, although in other implementations other protocols, such as peripheral component interconnect express (PCIe) may be used.

Unlike the cold storage system 100, the cold storage system 200 does not include an SAS expander. Instead, the DSDs 210, 220, and 230 are sequentially connected or daisy-chained together in series using the first and second ports 242 and 244, completing a loop with the host 201. When the host 201 sends a request for data, the host 201 sends the request to a port of one of the two directly connected DSDs, such as the first port 242 of the DSD 210. Due to the looped nature of the connections, the host 201 may instead send the request to the second port 244 of the DSD 230. Moreover, depending on the shortest route to a desired DSD, the host 201 may decide which direction to send the request, either outer DSD 210 or 230.

When the DSD 210 receives the request, the DSD 210 determines whether it is the intended recipient or destination for the request. If the DSD 210 is the destination, the DSD 210 spins up or otherwise powers up its storage media to fulfill the request. If the DSD 210 is not the destination, the DSD 210 forwards the request along its second port 244 to the first port 242 of its neighboring DSD, the DSD 220. In this way, when each DSD receives the request, it determines whether it is the destination and forwards the request when it is not the destination until the request reaches the destination. The destination DSD powers up while the other DSDs may remain spun down or otherwise in a low power state. Thus, it is possible to power up only one of the storage mediums of the DSDs in servicing the request.

A front-end control circuitry of each DSD, including the first and second ports 242 and 244, may allow the storage media of each DSD, such as a disk, to remain powered down together with control circuitry for controlling the storage media. The front-end control circuitry, such as a front-end 302 in FIG. 3, may be further optimized for reduced power consumption, as will be discussed below.

In the example of FIG. 2A, the host 201 may perform system management functions. For example, when the cold storage system 200 is first started, the host 201 may query a state of the system. The host 201 may send a signal to the DSD 210 requesting each DSD to announce itself or otherwise alert its presence so that the host 201 is aware of what DSDs are available and how to address them. The host 201 may internally store a map or table of each DSDs position. The map may help select routes by sending a data command through a shorter segment of the loop first. For example, the host 201 may determine to send a data command through a shorter segment of the loop by sending the data command to the first port 242 of DSD 210 rather than sending the data command through a longer segment of the loop by sending the data command to the second port 244 of DSD 230.

If a DSD along the loop or chain fails, the host 201 may be alerted in several ways. The host 201 may receive an unfulfilled data command that completed a loop, which may alert the host 201 that requested data was not found. The host 201 may also receive an unfulfilled data command back through its original path, which may indicate a DSD failure. Alternatively, the data command may time out, which may indicate a DSD failure. After determining that the data command failed, the host 201 may re-send the data command along the other path or other segment in the loop to fulfill the data command or further determine any error states. With the map of the loop, the host 201 may further send specialized or customized signals to better assess the state of the system.

FIG. 2B presents a cold storage system 250 according to one implementation including a host 251 and DSDs 260, 270, and 280 each having first and second ports. Unlike the cold storage system 200, the cold storage system 250 terminates with the DSD 280, such that a second port 296 of the DSD 280 is unplugged, or otherwise not in use for this connection. For example, the second port 296 may be connected to a termination circuitry 297 comprising a resistor 298 and a ground 299 in series connection. The DSD 280 may recognize the end of the chain of DSDs by the presence of the termination circuitry 297. Alternatively, the DSD 280 may recognize the end of the chain of DSDs by not detecting another DSD on the second port 296.

The configuration of cold storage system 250 can use fewer connections for a given number of DSDs than the cold storage system 200, and also uses only one port from the host 251. However, because the DSDs are not connected in a loop, a failure of a DSD may render the following DSDs inaccessible. The host 251 may perform additional management features, such as sending specialized signals, in order to better maintain the DSDs.

FIG. 3 presents one implementation of a DSD 300. The DSD 300 may be a HDD, SSD, SSHD, or other type of DSD and may be similar to the DSDs 210, 220, 230, 260, 270, and 280. The DSD 300 comprises a front-end 302 and a back end 304. The back end 304 includes a storage media 306. The storage media 306 may comprise a hard disk, flash memory, or other storage medium which ordinarily requires power in a powered up state. Power consumption of the DSD 300 may therefore be reduced by leaving the storage media 306 powered down until data from the storage media 306 is accessed.

The front-end 302 includes a system-on-a-chip (SoC) 310 and a component 320. The front-end 302 may be a printed circuit board (PCB) connected to the storage media 304. The front-end 302 remains powered on in order to receive, analyze, and send data commands. The front-end 302 has a first interface 312 for communicating with a host, such as the host 201, or with another DSD in the cold storage system. The first interface 312 may be a SATA or PCIe port, but may be a different protocol in other implementations. The SoC 310 may include a processor or a controller capable of communicating through the first interface 312 to receive data commands, analyze whether the DSD 300 is the destination, and send appropriate responses and/or forward data commands. In addition, the SoC 310 may include a controller capable of controlling the storage media 306.

Although DSDs commonly have a first interface, such as a port, many DSDs lack a second interface. In certain implementations the second interface 316 may be an existing port on the DSD 300, such as a second SATA/PCIe port. However, in other implementations, the second interface 316 may be formed by adapting the front-end 302 to make a second port available. Modern DSDs may have the SoC 310 connected to the component 320 through an internal interface 314, which may be a PCIe connection or other suitable protocol. The component 320 provides additional functionality depending on the application. For example, if the DSD 300 were a SSHD, the component 320 may be a NAND flash memory. Alternatively, the component 320 may be a WiFi chip, providing the DSD 300 with wireless networking capabilities. In other implementations, the component 320 may be a different chip or component.

Because the DSD 300 already has the internal interface 314, the second interface 316 may be formed by making the internal interface 314 available for external connection. The component 320 may be removed or otherwise bypassed to make the internal interface 314 available. The second interface 316 may further include a physical port connected to the internal interface 314.

In this manner, DSDs lacking a second interface may be reconfigured to have the second interface. For example, when DSDs are manufactured, a DSD may not yield enough storage capacity for a first capacity tier. Rather than discard the DSD, the DSD may be water-failed into a lower capacity tier. These water-failed DSDs may instead be repurposed into a cold storage tray, which has looser storage capacity requirements because the capacity of the entire tray, rather than each individual DSD, is considered. The water-failed DSDs may normally lack a second interface. By creating the second interface from an internal connection, the water-failed DSDs may be suitable for the cold storage systems of the present disclosure.

The front-end 302 may be further optimized to reduce power consumption. Rather than keeping many or all of the components of the front-end 302 powered on, such as the SoC 310, the front-end 302 may include further specialized hardware that can more quickly and efficiently analyze each data command while keeping the rest of the front-end 302 and the back end 304 powered down. For example, the front-end 302 may include a processor 315. The processor 315 may be a specialized low-power processor to inspect traffic on the first interface 312 and the second interface 316 without having to power up the SoC 310. Specifically, the processor 315 inspects packets received on one of the first interface 312 or the second interface 316, determines whether the DSD 300 is the destination, and either powers on the hardware needed to service the data command, or passes the packets along the other interface. In other implementations, the processor 315 may be integrated with the SoC 310.

FIG. 4 presents a flowchart 400 of a logic process of one implementation of the present disclosure. At 410 a DSD, such as the DSDs 210, 220, 230, 260, 270, 280, and 300, receives a data command or request for data on a first port, such as the first port 242 or 292. The request originates from a host, such as the host 201 or 251, but may have been received on the first port directly or passed through another DSD.

A front-end of the DSD, such as the front-end 302, may be powered on in order to analyze the request. The back-end of the DSD, such as the back end 304, and related back-end channels may remain powered down. At 420, the front-end determines whether the current DSD is the destination (i.e. can fulfill the request for data). If the current DSD is not the destination, then at 430 the front-end sends the request along a second port, such as the second port 246 or 294, to send the request down the chain.

If the current DSD is the destination, then at 440 the front end powers up the storage medium to perform the request by retrieving the requested data. Once the requested data is found on the storage medium, the data may be sent back along the first port to the host. Alternatively, the data may be sent along the second port, for example, if the route to the host was shorter along the second port. If the data was not found on the storage medium, the DSD may send an error signal back to the host, or may send the request on the second port to see if another DSD down the chain can fulfill the request. Once the data retrieval is complete, the storage medium is powered down again.

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example implementations is provided to enable any person of ordinary skill in the art to make or use the implementations in the present disclosure. Various modifications to these examples will be readily apparent to those of ordinary skill in the art, and the principles disclosed herein may be applied to other examples without departing from the spirit or scope of the present disclosure. The described implementations are to be considered in all respects only as illustrative and not restrictive and the scope of the disclosure is, therefore, indicated by the following claims rather than by the foregoing description. All changes which come within the meaning and range of equivalency of the claims are to be embraced within their scope.

The invention claimed is:

1. A data storage system comprising:
   a host;
   a plurality of data storage devices (DSDs), each of the plurality of DSDs comprising:
      a first control circuitry;
      a first Serially Attached SCSI (SAS) port;
      a second SAS port; and
      a storage medium configured to store data;
      wherein the first control circuitry is configured to:
         receive a data command on the first SAS port;
         determine whether the DSD is a destination for the data command;
         send the data command on the second SAS port of the DSD if the DSD is not the destination for the data command; and power up the storage medium to service the data command if the DSD is the destination for the data command; and wherein the plurality of DSDs is connected by a sequential connection with the second SAS port of at least one DSD of the plurality of DSDs connected to the first SAS port of another DSD of the plurality of DSDs, and wherein a first DSD of the plurality of DSDs is configured to communicate with the host through the first SAS port of the first DSD and a last DSD of the plurality of DSDs is configured to communicate with the host through the second SAS port of the last DSD to form a loop in the sequential connection such that the host is directly connected to the first SAS port of the first DSD and directly connected to the second SAS port of the last DSD.

2. The data storage system of claim 1, wherein at most one of the storage mediums of the plurality of DSDs is powered up at a time.

3. The data storage system of claim 1, wherein the host is further configured to map the plurality of DSDs.

4. The data storage system of claim 1, wherein the host is further configured to determine that the data command failed after a predetermined amount of time has passed without completing the data command.

5. The data storage system of claim 1, wherein the host is further configured to determine whether to send the data command through a first segment of the loop by sending the data command to the first SAS port of the first DSD or to send the data command through a second segment of the loop by sending the data command to the second SAS port of the last DSD.

6. The data storage system of claim 5, wherein the host is further configured to:
send the data command through the first segment of the loop;
determine that the data command failed after sending the data command through the first segment of the loop; and
resend the data command through the second segment of the loop.

7. The data storage system of claim 1, wherein each DSD further comprises second control circuitry configured to control the storage medium, wherein the first control circuitry is further configured to determine whether the DSD is the destination for the data command without powering on the second control circuitry.

8. The data storage system of claim 7, wherein each DSD further comprises a processor including the first control circuitry and the second control circuitry.

9. The data storage system of claim 7, wherein each DSD further comprises a first processor including the first control circuitry and a second processor including the second control circuitry.

10. The data storage system of claim 1, wherein each DSD further comprises an internal interface to the first control circuitry, the internal interface being connected to the second port.

11. A method for accessing data from a data storage system including a host and a plurality of data storage devices (DSDs), wherein the plurality of DSDs is connected by a sequential connection with a second Serially Attached SCSI (SAS) port of at least one DSD of the plurality of DSDs connected to a first SAS port of another DSD of the plurality of DSDs, the method comprising:
receiving a data command at a first DSD of the plurality of DSDs;
determining whether the first DSD is a destination for the data command;
sending the data command to a second DSD of the plurality of DSDs if the first DSD is not the destination for the data command;
powering up a storage medium of the first DSD to service the data command if the first DSD is the destination for the data command;
wherein the first DSD is configured to communicate with the host through a first SAS port of the first DSD and a last DSD of the plurality of DSDs is configured to communicate with the host through a second SAS port of the last DSD to form a loop in the sequential connection such that the host is directly connected to the first SAS port of the first DSD and directly connected to the second SAS port of the last DSD.

12. The method of claim 11, wherein at most one of the storage mediums of the plurality of DSDs is powered up at a time.

13. The method of claim 11, wherein receiving the data command at the first DSD further comprises receiving the data command on the first SAS port of the first DSD, and wherein sending the data command to the second DSD further comprises sending the data command along a second SAS port of the first DSD.

14. The method of claim 13, further comprising returning the data command along the first SAS port of the first DSD when the second DSD is unavailable.

15. The method of claim 13, further comprising discarding the data command when the second DSD is unavailable.

16. The method of claim 11, further comprising mapping the plurality of DSDs.

17. The method of claim 11, further comprising determining whether to send the data command through a first segment of the loop in the sequential connection between the plurality of DSDs or to send the data command through a second segment of the loop in the sequential connection.

18. The method of claim 17, further comprising:
sending the data command through the first segment of the loop;
determining that the data command failed after sending the data command through the first segment of the loop; and
resending the data command through the second segment of the loop.

* * * * *